APPARATUS FOR AUTOMATIC PRODUCTION OF GRAMOPHONE RECORDS

Original Filed Oct. 9, 1962 7 Sheets-Sheet 1

APPARATUS FOR AUTOMATIC PRODUCTION OF GRAMOPHONE RECORDS

Original Filed Oct. 9, 1962 7 Sheets-Sheet 2

APPARATUS FOR AUTOMATIC PRODUCTION OF GRAMOPHONE RECORDS

Original Filed Oct. 9, 1962 7 Sheets-Sheet 3

APPARATUS FOR AUTOMATIC PRODUCTION OF GRAMOPHONE RECORDS

Original Filed Oct. 9, 1962 7 Sheets-Sheet 4

APPARATUS FOR AUTOMATIC PRODUCTION OF GRAMOPHONE RECORDS

Original Filed Oct. 9, 1962 7 Sheets-Sheet 5

APPARATUS FOR AUTOMATIC PRODUCTION OF GRAMOPHONE RECORDS

Original Filed Oct. 9, 1962 7 Sheets-Sheet 6

United States Patent Office

Re. 27,184
Reissued Oct. 12, 1971

27,184

APPARATUS FOR AUTOMATIC PRODUCTION OF GRAMOPHONE RECORDS

Walter Leslie Rand, Gerrards, and Leslie Eric Zouch, Hays, England, assignors to Electric & Musical Industries Limited, Middlesex, England Original No. 3,329,997, dated July 11, 1967, Ser. No. 574,478, Mar. 8, 1966, which is a division of Ser. No. 229,332, Oct. 9, 1962. Application for reissue July 3, 1969, Ser. No. 848,368
Claims priority, application Great Britain, Oct. 11, 1961, 36,423/61
Int. Cl. B29d *17/00*
U.S. Cl. 18—5.3 P 7 Claims

Matter enclosed in heavy brackets [ ] appears in the original patent but forms no part of this reissue specification; matter printed in italics indicates the additions made by reissue.

*ABSTRACT OF THE DISCLOSURE*

*The invention relates to a machine for producing gramophone records, the machine comprising a moulding press including two mould supports and means for repetitively moving the mould supports together and then apart to press gramophone records. At one side of the press there is located means for repetitively producing a shot of mouldable material sufficient to form a gramophone record and having two labels adhering respectively to the upper and lower surfaces of the shot. A reciprocating shot loader transfers each shot and the adhering labels to the press while the mould supports are apart, the shot loader being withdrawn before the mould supports are moved together to press the respective record. The shot loader supports the shot by means of suction applied to one of the labels. Pairs of grippers are provided on two endless bands located at the front and rear of the press and these bands are moved intermittently so that a pair of grippers is located in a position to seize the flash of a record as it is moulded in the press. When the press is opened, the bands are moved to transfer the record from the press to a record processing tool, located at the other side of the press from the means for producing the shot.*

Figure 1:
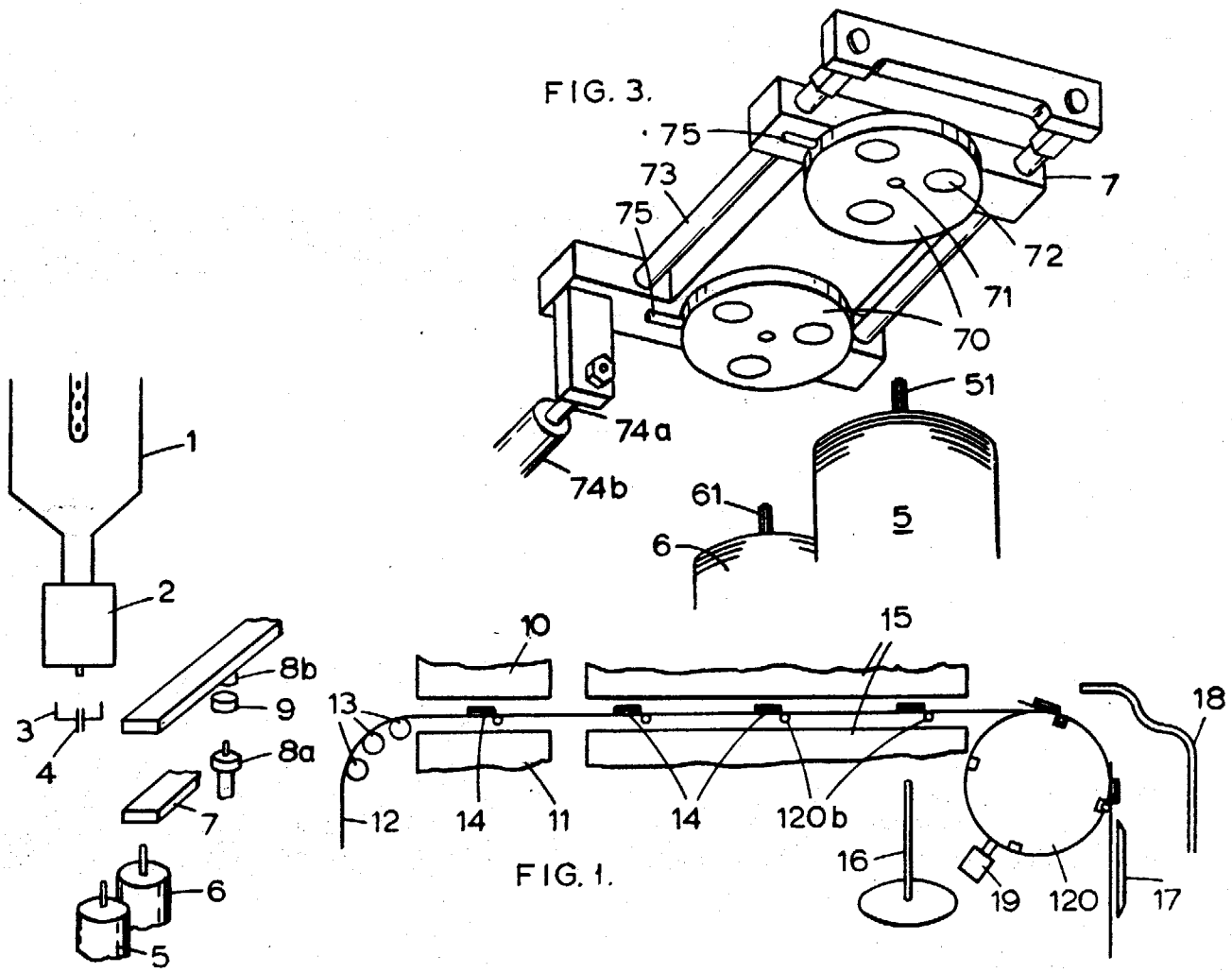

This application is a division of our co-pending application Ser. No. 229,332, filed Oct. 9, 1962, now Patent No. 3,264,386, *which has now become Reissue Patent No. 26,911.*

This invention relates to the automatic production of gramophone records.

It has been proposed to produce gramophone records from granulated mouldable material by an entirely automatic process throughout with no intermediate operations having to be performed manually by the press operator. The advantages of such a system are evident. However, certain complexities and disadvantages are apparent in all the proposed systems. One complexity is that of transferring the mass of pre-heated material, hereinafter called the shot, and the labels to the press. In particular, in accordance with one prior proposal it would be necessary to lift the leaf of the record press itself at least once during the production of each individual record in order to obtain access to the leaf. This process involves a certain loss of time and further mechanical linkages and the loss of time in particular becomes a matter of consideration in view of the large numbers of copies of a single record which are usually produced. Difficulties are also encountered in obtaining concentricity in the shot, when it is positioned in the press.

It is one object of the present invention to provide a machine for the production of gramophone records which reduces one or more of the above mentioned difficulties.

In accordance with the present invention there is provided a machine for the production of gramophone records, comprising a moulding press for pressing a record groove in mouldable material, means for delivering a quantity of said mouldable material to a label to cause the mouldable material to adhere to the label and transfer means operable to contact and convey the label and thereby the material to the moulding position in said moulding press.

*A further object of the invention is to provide an improved machine for the production of gramophone records whereby preformed mouldable material together with both the upper and lower labels disposed in their correct relationship are presented to the record press simultaneously.*

*According to this aspect of the invention there is provided a machine for producing gramophone records comprising a moulding press including two mould supports and means for repetitively moving the mould supports together and then apart to press gramophone records, means for repetitively producing a shot of mouldable material sufficient to form a gramophone record and having two labels adhering respectively to the upper and lower surfaces of said shot, loading means for transferring each shot and the adhering labels to the press while said mould supports are apart, means for withdrawing said loading means and thereafter moving said mould supports together to press a record, and means for removing the pressed records from the press when said mould supports are again moved apart and before said loading means transfers a further shot to said press.*

Figure 2:
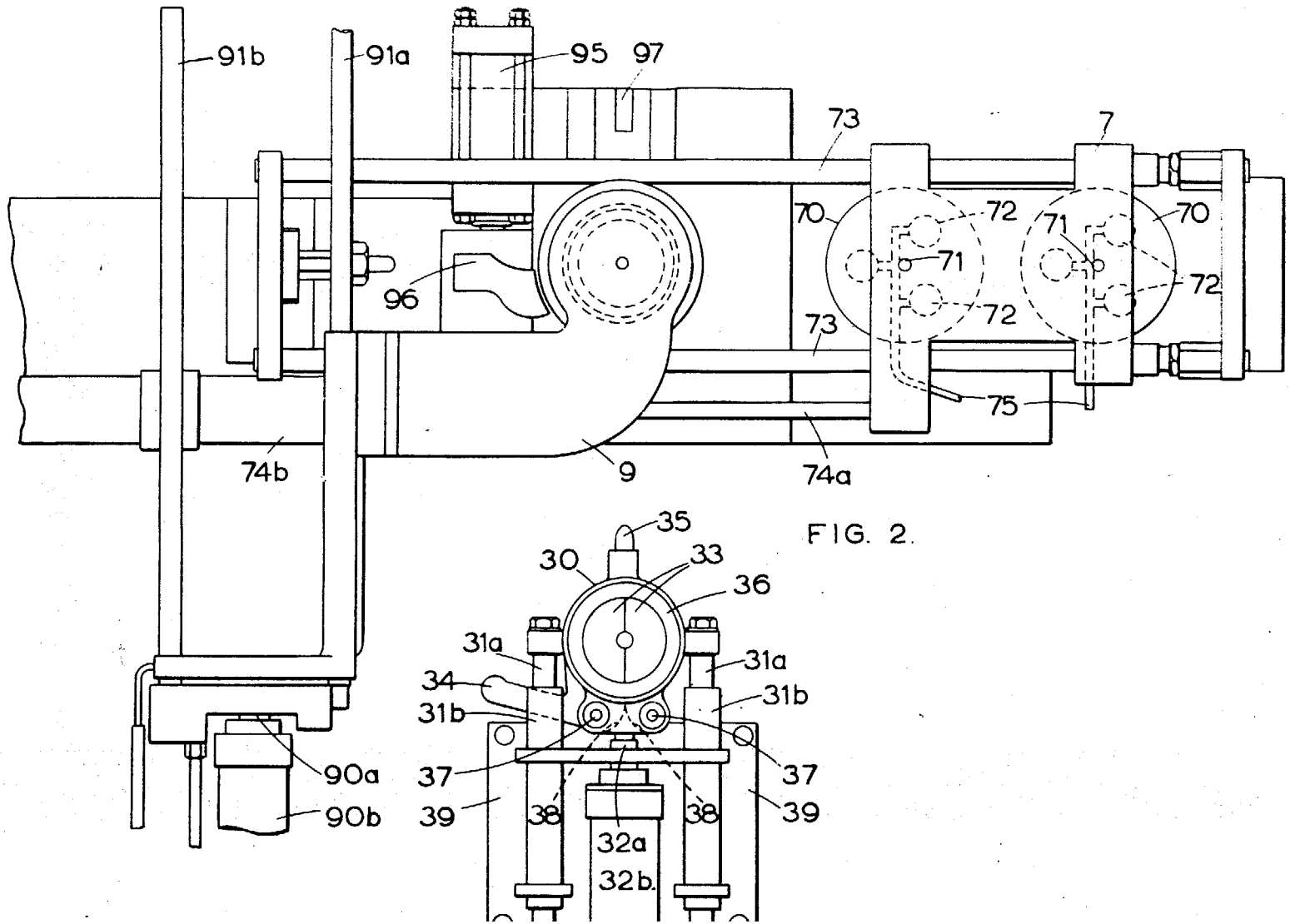
Figure 4A:
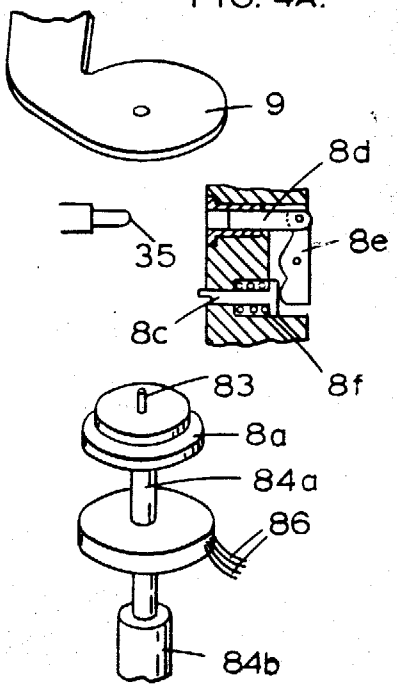
Figure 4:
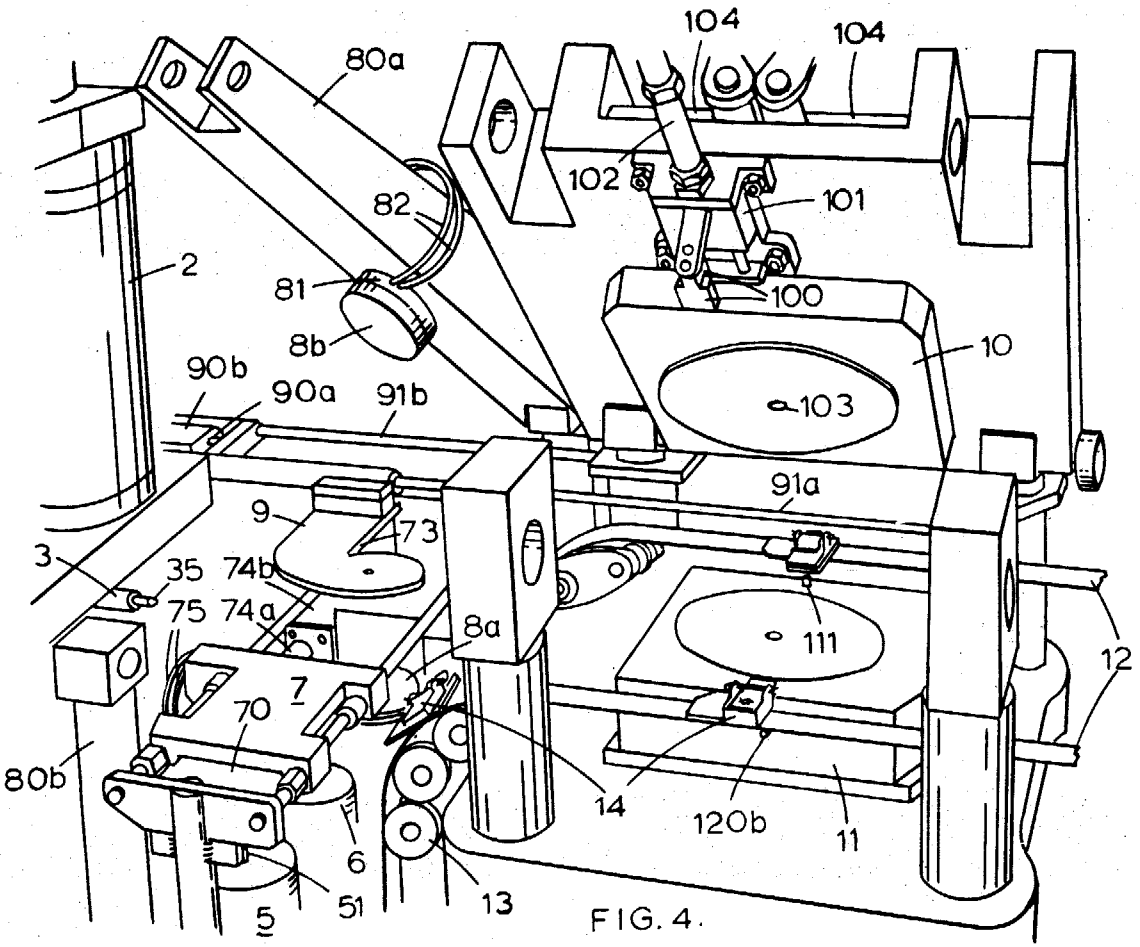
Figure 5:
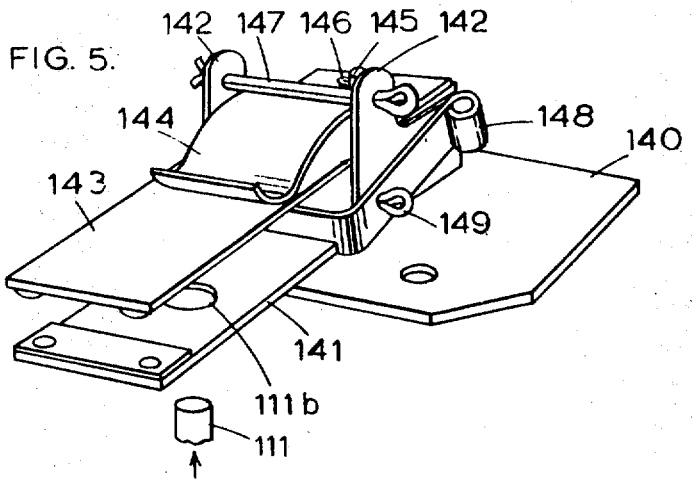
Figure 6:
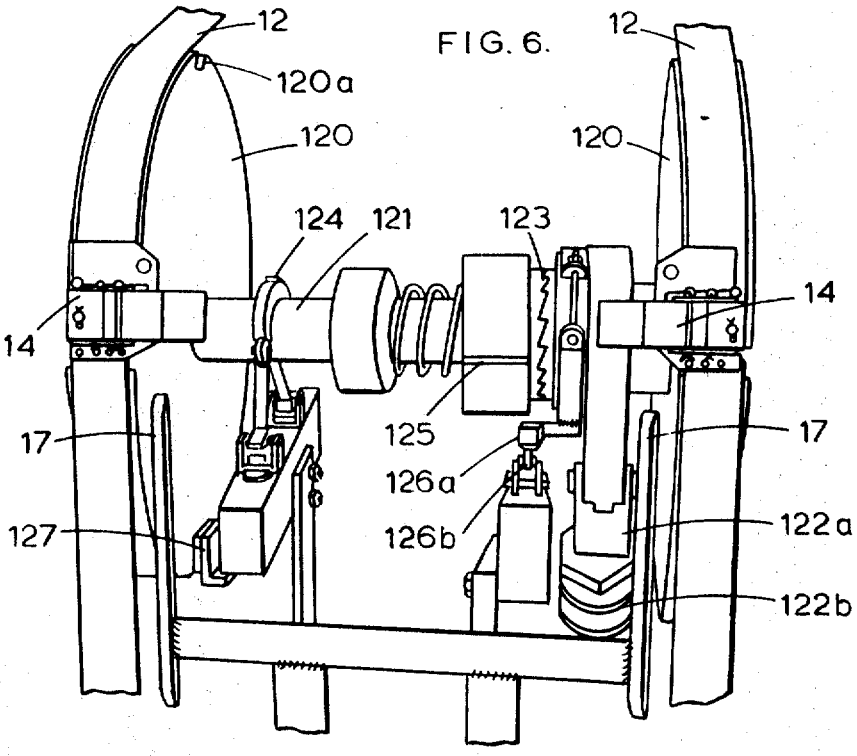
Figure 7A:
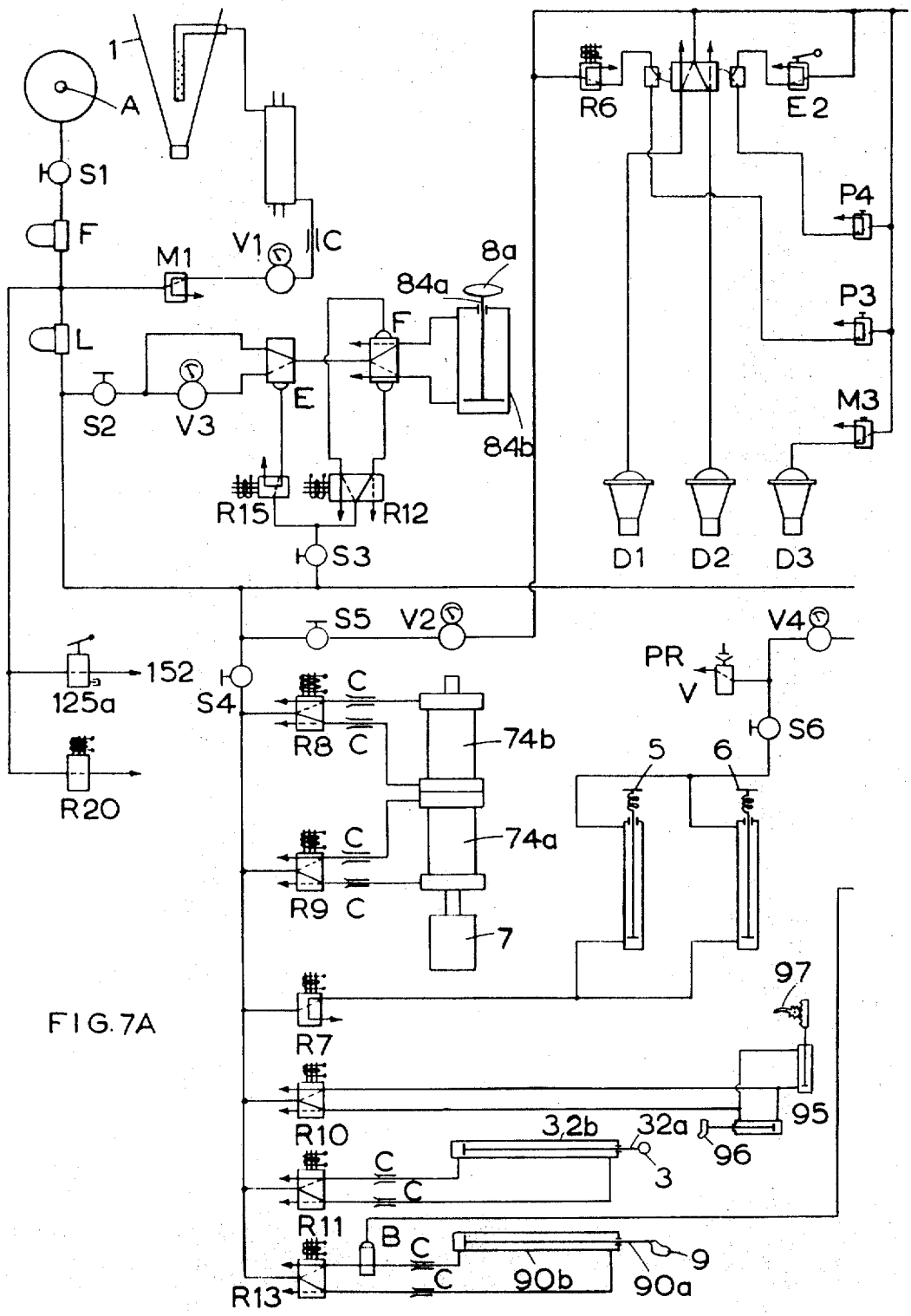
Figures 7A, 7B:
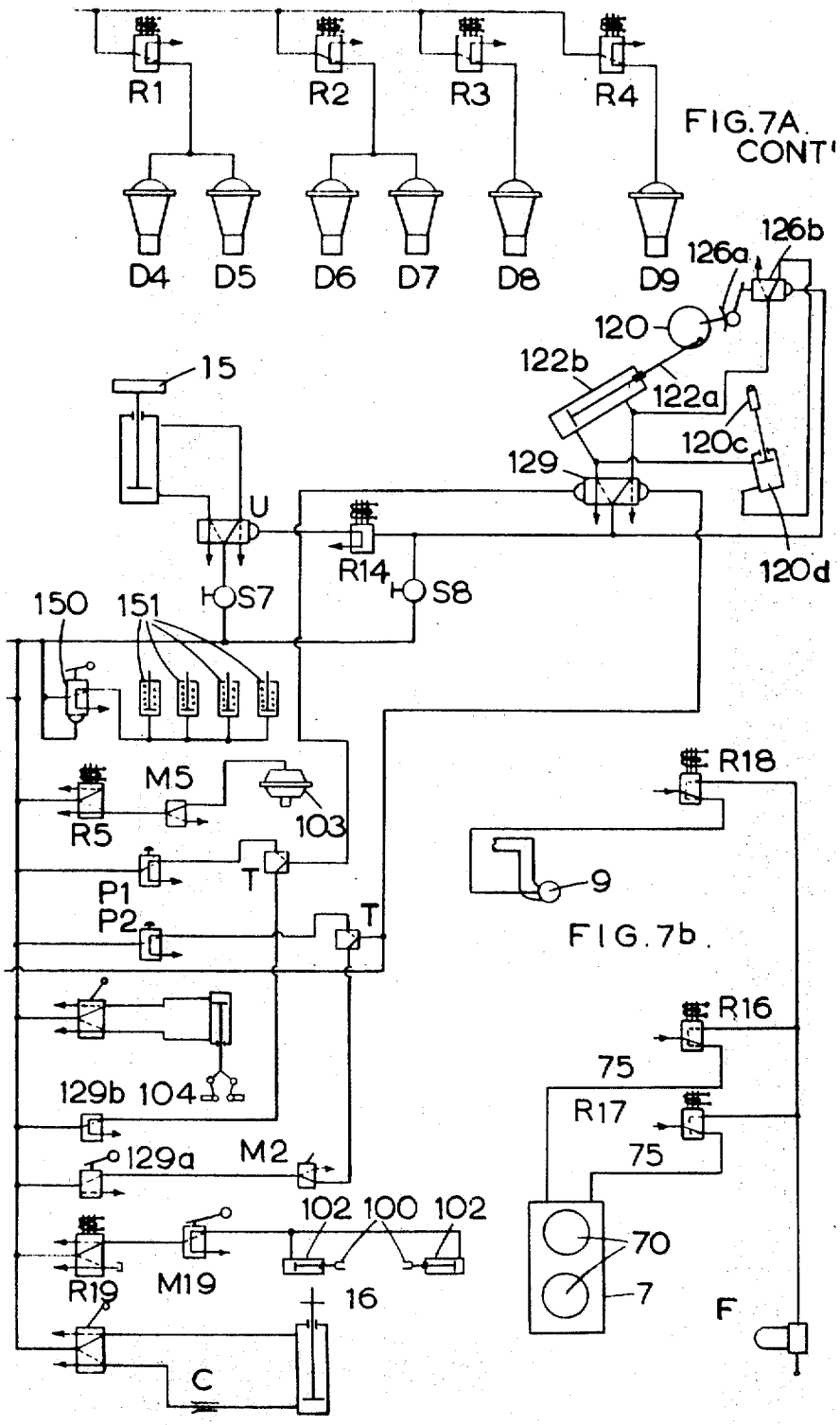
Figure 8:
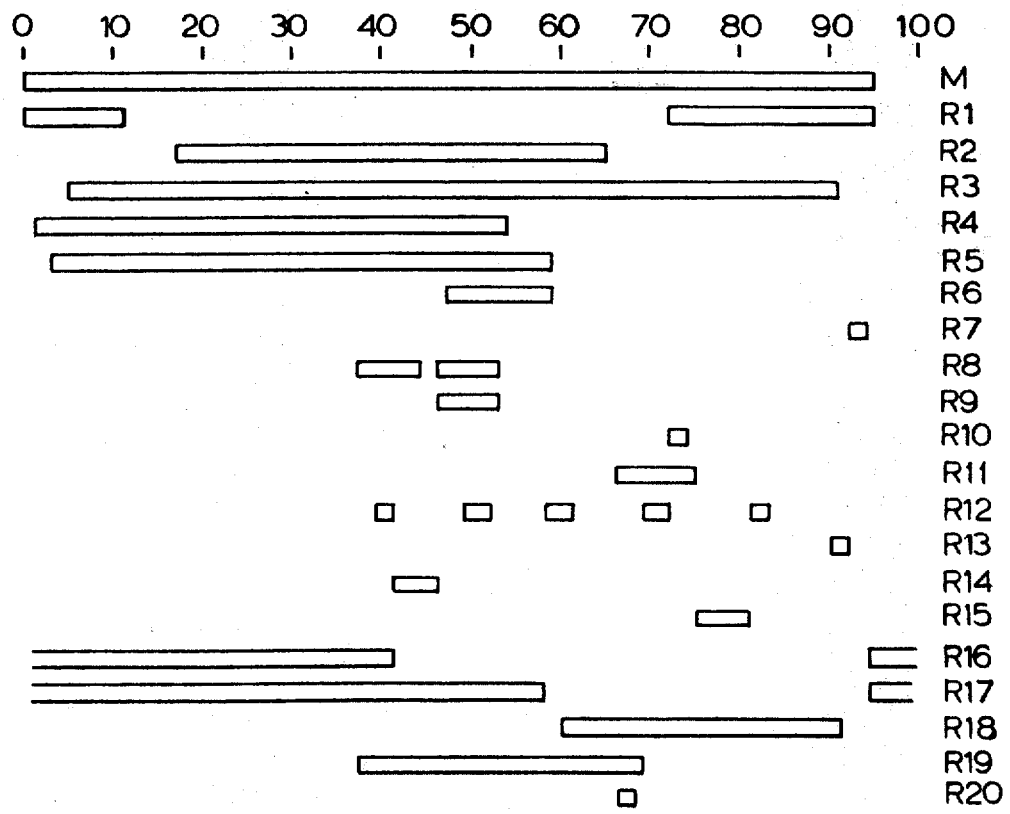

Further objects and features of the present invention will become apparent and the invention clearly understood and more readily carried into effect when applied to a particular embodiment described with reference to the accompanying drawings, in which:

FIG. 1 shows the diagrammatic layout of an automatic record forming machine,

FIG. 2 shows in plan view the construction of a cup for transporting the shot, the shot loader, and label loader operating mechanisms, FIG. 3 illustrates by means of a perspective view the assembly of the label magazines and label loader, FIG. 4 is a general perspective view illustrating the shot former and shot and label loaders and the press. In FIG. 4 a bridge 80a and the leaf of the press 10 are shown lifted to reveal the parts underneath, FIG. 4A is a detail view of part of the machine which cannot be seen in FIG. 4, FIG. 5 shows the grippers and methods of release, FIG. 6 shows a perspective view of the conveyor drive unit, FIG. 7A is a general circuit of the air services to the machine, FIG. 7B is a general circuit of the vacuum services to the machine, and FIG. 8 is a timing diagram of the solenoids shown in FIG. 7A and FIG. 7B.

A general description of the method of producing records by operation of the press will now be given with particular reference to FIG. 1 and also FIG. 4.

The granulated moulding composition is stored in a hopper 1 where it is kept dry by a supply of heated air being passed through a perforated tube which is located within the hopper. Beneath the hopper 1 is located an extrusion cylinder 2 in which the granulated composition is steam heated to a temperature sufficient to render it plastic. The actual temperature involved will depend on the moulding composition being used. The construction of the hopper and extrusion cylinder may be of a type well known in the art whereby a suitable measured quantity of mouldable material is caused to issue from the extruder nozzle into cup 3. This heated material is now called the shot. Through an aperture in the base of cup 3 is raised a pin 4 and when the shot is urged through the heated nozzle of the extruder cylinder 2 it falls upon this pin. It has been found that a pin with the conventionally shaped convex top tends to throw the extruded shot to one side of the cup. In the present embodiment a concave top is provided on the pin 4 giving greater concentricity of the shot within the cup 3. Other shapes of pin producing the same result are suitable.

The labels are stored in two air operated magazines 5 and 6 located on the front of the machine and provided with splined centre pins in order to prevent rotation of the labels within the magazines. The upper labels are stored face uppermost in magazine 5 and the lower labels are stored face down in the magazine 6. An air operated label loader 7 capable of two strokes of different lengths is furnished with suction cups which pick up a pair of labels simultaneously when these are offered by magazines 5 and 6. The loader 7 is normally located over the magazines 5 and 6 and in operation moves in one stroke to position the lower label which it has picked up upon the lower shot former plate 8a and then in a further stroke to position the upper label upon the plate 8a. Plate 8a can be raised and lowered by means of an air cylinder capable of working at either high or low pressure. All the operations of plate 8a hereinafter described will be at low pressure unless otherwise stated. The shot former consists of two parts, 8a the lower plate, and 8b the upper plate. Both plates are heated and the upper plate 8b is fixed to a bridge while the lower plate 8a is, as noted, fitted to an air cylinder and provided with a pin. The length of the pin in the lower shot plate 8a controls the thickness and diameter of the formed shot. It also provides, a hole in the centre of the shot which serves as a location on the press centre pin. The thickness of the shot is such that no material leaves the label area and therefore cannot adhere to the former plates.

Located at rest immediately beneath the plate 8b is a shot loader 9 with suction means on its lower face. When the label loader returns to its normal position plate 8a is again raised to offer the upper label to shot loader 9. Plate 8a with the lower label is now lowered and the shot in the cup is positioned beneath plate 8b and shot loader 9 and plate 8a is raised to receive the shot which is released through the bottom of cup 3 on the opening of a pair of geared doors assisted by the operation of a knockout device. The cup 3 is furnished with a pilot pin which operates a device to restrict the stroke of the lower plate 8a and prevent the cup being trapped. The actual moment when extrusion of the shot takes place occurs as soon before the positioning of the cup as is practicable in order to reduce chilling the shot. The shot former plate 8a is now lowered carrying the lower label with the shot located upon it and the cup is returned to its normal position beneath the extruder nozzle. Plate 8a is raised under high pressure and the shot is compressed between the labels against loader 9 supported by the upper former plat 8b, and the lower former plate 8a. At this stage a dwell is incorporated to allow the shot to assume as flat a shape as possible. The loader 9 controlled by an air cylinder travels to the press lower mould 11 carrying the labels and shot. Here the vacuum is released and the labels and shot are positioned on the lower mould 11 of the press. The loader 9 is returned and the press closed by bringing the bed up to the upper mould 10 mounted on the leaf. During the [mouling] *moulding* operation, the centre hole of the record, partly formed by the pin 4 and the pin of the former plate 8a, is moulded to correct size. It will be seen that no necessity arises for lifting the leaf and upper mould 10 during the normal cycle of operation for the purpose of positioning the upper label. On either side of the press comprising parts 10 and 11 a pair of conveyor belts 12 are located passing over idler rollers 13. On each belt at predetermined intervals are mounted grippers 14 which seize the flash extruded from the press and thus are able to convey the pressed shot, hereinafter called the record, to the subsequent tool stations when the hydraulically operated press has been opened. A number of subsequent operations may be performed on the record and in the present embodiment three typical operations are described. The hydraulic press being opened the record is conveyed by the [bolts] *belts* 12 and the grippers 14 to the next station which is part of a two stage tool contained within an air press generally indicated by the reference numeral 15. At the first stage of this tool the grippers are released as a pilot pin enters the moulded centre hole. The pilot pin serves to locate the record. The operation and the reason for the release of the grippers will be more fully described hereinafter. Here slots to provide an alternative centre hole are punched. The grippers 14 then resume hold on the flash and the record is conveyed to the second station, where it is blanked or removed from the flash. The record is allowed to drop over a record stand 16 which may be lowered when filled by means of an air cylinder and replaced by an empty stand which is then raised to the operating position. The flash is carried off by the conveyors 12 and the grippers 14 to a flash release device 17 and a flash collector 18. The conveyors 12 are controlled as is apparent to move in steps by a conveyor drive unit comprising cylinder 122b (FIGURE 6). It is similarly apparent that the belts 12 must operate simultaneously and travel at an equal and predetermined distance each time the presses are opened. Means for achieving this are considered in more detail hereafter.

To further facilitate an understanding of the present invention some of the parts referred to in the general description which are not of generally known construction will now be more fully considered.

Certain portions of the machine such as the hydraulic press, the air press and tool and the hopper are substantially conventional items with which it is not proposed to describe in detail in the interests of brevity.

THE CUP

FIG. 2 illustrates the cup which is used for accepting the extruded shot and conveying it to the shot former. The cup 3 consists of a body 30 with a liner 36 which is made of aluminum and is used to minimize the risk of the shot sticking to the cup. The bottom of the cup is provided with a pair of doors 33 at the centre of whose junction is located a hole through which pin 4 may pass during the process of extrusion. The cup is located on a pair of guide rolls 31a which run in sleeves 31b mounted on a base plate 39. Movement of the cup is achieved by an air cylinder 32b which drives a piston 32a which is secured to the cup body 30. The pins 37 pass through the cup body and pivotally mount the doors 33 which are geared together at the points indicated by dotted lines 38. From one of these doors 33 extends a lever 34 which is operated to cause the opening of doors 33 to release the shot. This lever is operated by an arm 96 mounted on an air cylinder 95 located at the position of the shot former. When the cup 3 is moved forward by piston 32a to opening position above the plate 8a, the arm 96 is advanced to engage and operate the lever 34. A pilot pin 35 (see also in FIGURE 4) is provided on the leading side of the cup and it is this pilot pin which is used to push out a stop pin 8c from the machine frame via a rocker arm [80] *8e* and a pin 8d which restricts the stroke of the shot former plate 8a when it rises to receive the shot from the cup as shown in FIGURE 4A. When the air cylinder 95 operates the arm 96 a second cylinder is energized to operate an arcuate knockotu arm 97, shown diagrammatically in FIGURE 7A which enters the body of the cup from the top to push out the shot.

The timing of the knockout and cup opening cylinders is effected by solenoid valve R10.

MAGAZINES AND LABEL LOADER

FIGURES 3 and 4 illustrate the two label magazines and a label loader. FIGURE 2 further illustrates the label loader, but for clarity omits the magazines. The magazines 5 and 6 are fitted, as shown, with splined centre pins 51 and 61 and are mounted on the pistons of air cylinders which, being basically conventional items, are not shown in detail but are diagrammatically indicated in FIGURE 7A. In order to allow compensation for the varying height of a stack of labels the magazines are not mounted directly upon the pistons of the air cylinders but are coupled through springs. The label magazines at rest are held down by a low pressure vacuum of 30 lb. per square inch which is supplied through a reduction valve V4 (FIGURE 7A). When the timer operated solenoid R7 switches the full air pressure to the lower part of the magazine cylinders to raise the magazines 5 and 6 the low pressure air supply [air supply] is relieved to the atmosphere through a pressure relief valve shown in FIGURE 7A and indicated by the reference letters PR. Located to reciprocate immediately above the magazines 5 and 6 is the label loader carrier 7 with the label loaders 70 rigidly mounted upon it. Through the centres of loaders 70 and passing through the plate 7 are holes 71 which accept the splined centre pins 51 and 61 and each loader 70 is provided with suction cups 72 in the form of cavities connected to vacuum ways within the body of each loader, the vacuum ways being connected to a suitable source of vacuum by way of pipes 75. The label loader plate 7 is mounted on guide rods 73 (FIGURES 3 and 4) and connected, as shown, to an air cylinder 74b provided with a piston 74a. This air cylinder as hereinafter described is a duplex cylinder of known construction and is capable of two strokes of different lengths. The pipes 75 are connected via individual valves R16 and R17 (FIGURE 7B) to the source of vacuum in order that the suction to the pads 72 may be controlled individually on each loader 70.

SHOT FORMER AND LOADER ASSEMBLY

General layout of the short former and loader asembly is described with reference to FIGURES 2 and 4. Reference numeral 80a which shows a rigidly mounted bridge which extends across the width of the machine and serves to support the upper shot former plate 8b and the shot loader plate 9 when the lower shot former plate 8a compresses the shot under high pressure. When the bridge is closed it is bolted to the pillar 80b. The upper shot former plate 8b and its associated heating element 81 supplied with leads 82 is rigidly fixed to the bridge 80a while the loader plate 9 is constructed with a hollow chamber and is slidably mounted on rails 91a and 91b. Holes are drilled in the lower face of plate 9 so that a vacuum applied to the chamber within plate 9 permits the carrying of the formed shot and the labels. The traversal of plate 9 is accomplished by the air cylinder 90b, the piston 90a of which is attached by means of a bracket to the plate 9. The lower shot former 8a is provided with a centre pin 83, the purpose of which has been described, and is connected to the piston 84a of an air cylinder 84b (FIGURE 4A) which is capable of operation both under high and low pressures. The piston 84a passes through the centre of a heating element 85 provided with [loads] *leads* 86. When the former is at rest the plate 8a is arranged to be in thermal contact with heating element 85. Means for restricting the stroke of the air cylinder 84b are shown in FIGURE 4A comprising as previously indicated a pin 8c located in a bearing secured to the machine frame. The pin 8c is actuated by the pilot pin 35 on the cup shown in FIGURES 2 and 4, through the intermediary of sliding rod 8e and the lever 8d against the urge of spring 8f, the pin moving into the path of the lower plate 8a at a predetermined point in its travel thereby effectively preventing further upward movement. FIGURES 7A and 8 illustrate the control of the shot former which is dependent entirely on the operation of the timers R12 and R15, the low pressure operation of the former being obtained by the reduction of the supply pressure through a variable valve V3.

THE GRIPPERS AND HYDRAULIC PRESS RELEASE MECHANISM

FIG. 5 shows the construction of one of the grippers for conveying the record by the flash extruded from the press. The gripper is mounted on a base plate 140 which is secured to the conveyor belts 12. To the base plate 14( is attached the lower jaw 141 of the gripper which is provided with a pair of flanges 142. The upper jaw 143 is pivotally attached to the rear of the flanges 142 by means of a pin not shown in the diagram and this upper jaw is urged into contact with the lower jaw by a leaf spring 144. The spring 144 is attached to the upper jaw 143 at the rear by means of a pin 145 and a split pin 14( and operates against the restraint of a split pin 147 which passes between the flanges 142 of the lower jaw as shown. A further arm 148 is pivotally mounted on a further split pin 149 in such a way that pressure upon the rear portion of this arm will tend to raise the upper jaw 143 out of contact with the lower jaw 141. The opening of the grippers within the press as achieved by the action of a pair of pins 111 (one at each side of the press) which is attached to the bed 11 of the hydraulic record press. When the press is closed a pair of steadying fingers 10( (FIGS. 4 and 7A) are [insterted] *inserted* at each side of the press from a bracket 101 under the control of an air cylinder 102 and pass above the plate 140 and beneath the conveyor belt 12 at the point where it is secured to the plate 140 and the pin 111 rises with the lower mould 11 of the press passing through a hole 111b in the lower jaw 141 and urging the upper jaw 143 open. For convenience and more positive control of the record the belt steadying fingers 100 are arranged to be inserted to hold the gripper and belt through a control valve M1 activated by the movement of the body of the press upon which the lower mould 11 is mounted. Withdrawal of the steadying fingers is achieved by the timers operating solenoid valve R19 and can therefore be permitted to occur before the opening of the press. The effect of this arrangement is to allow the grippers and belt to twist slightly so that the jaws of the gripper close on the extruded flash of the record in spite of the fact that pin 111 still passes through the hole in the lower jaw 141. An advantage of this arrangement is that the record is always positively located. When the press is opened the pin 111 is withdrawn from the hole in the lower jaw, and [the] *the* grippers and belt carry the record by its flash to the next station where the alternative centre slots are punched. The centre hole is moulded to full size in the press, and reference 103 in FIGS. 4 and 7A show the provision of a moulding centre pin on the upper mould 10. FIG. 8 shows the timing of the operation of this device which may however be rendered inoperative for setting up purposes by the operation of switch M5 shown in FIG. 7A. At the next station, and if desired also at the subsequent station the grippers are again released by means of an operating arm pressing on the rear of arm 148 under the influence of an air piston 151 controlled by a valve 150 operated by the closing of the tool press. This arrangement permits the pilot pins to centre the record in the tool thereby resulting in greater concentricity of the finished record. It is evident that a certain variation in the position of subsequent records may take place if any distortion takes place with cooling. At the second stage of the air press an air blast nozzle 152 (FIG. 7A left) is located in the lower portion of the blanking tool which assists in lifting the leading edge of the flash momentarily, as it passes over the cutting edge of the tool and prevents the record folding into the tool and thus becoming reject. When the record is blanked it drops onto the record station 16 which is raised by an air cylinder, and the grippers transport the flash to the flash release assembly 17 and the flash collector assembly 18. Reference to FIG. 1 shows this arrangement and it can be seen that as the gripper and belt passes round the drum the flash will be tilted to thread on to the swan neck of the collector rod 18. The release rod 17 merely takes the form of a wedge which is inserted between the jaws 141 and 143 of the grippers causing them to open as the belt is driven leaving the flash over the collector rod 18. The air press is not illustrated in detail since its construction is conventional.

CONVEYOR DRIVE UNIT AND INTERLOCK MECHANISM

The conveyor belts 12 form closed loops the top runs of which pass over idler rollers 13 and two driven wheels 120 mounted on axle 121, by which wheels the belts are advanced. The lower runs of the belts pass over two pairs of idler wheels which are not shown. The inside of the belt is provided with dogs 120b which engage in notches in the wheels such as 120a on the wheels 120 (FIG. 6). The idler rollers 13 are cut away at their centres to allow the dogs 120b to pass between the flanges thus formed. The driving of the wheels 120 is accomplished by means of an air cylinder 122b and piston 122a (FIGS. 6 and 7A). The drive is transmitted in known manner through a dog clutch 123 which is located on the axle 121. Also located on axle 121 are three cams, one cam which is shown at 124 is mounted rigidly on the axle and controls a suitable interlock mechanism whereby the interrelation of operations of the machine is protected. A further cam 125 is located on the driven member of the dog clutch and is used to control, via valve 125a, shown in FIG. 7A, the air blast which lifts the record over the last tool station as described hereinbefore. The third cam is shown by reference 126a and operates an air valve 126b on the driving stroke of the piston 122a, this valve controls the operation of a locking device 120c (not seen in FIG 6 but represented in FIG. 7A) which engages the appropriate one of the notches 120a on the periphery of the right hand wheel 120 thereby ensuring positive stopping of the conveyor belts 12. This locking mechanism is arranged to be withdrawn slightly before the next driving stroke of the piston 122a and therefore friction brakes 127 are applied to the left hand wheel 120 to provide a further control when the locking device is withdrawn.

Reference to FIG. 7A illustrates the air circuit which controls the operation of the conveyor drive unit and its associated cams. A diagrammatic indication of the construction of the locking mechanism 120c which is arranged to be inserted under the control of valve 126b. The position of the drive wheel 120 and the associated piston 122a in FIG. 7A is shown at the end of a driving stroke and it will be seen that machine operated valve 129a is operative to allow air pressure from the main supply line to be passed through a manual switch M2 to the control valve 129. To initiate the arming stroke of the piston 122a valve 129a is released and machine operated valve 129b is switched to allow pressure to pass to control valve 129 to switch the air supply to the lower point in the cylinder 122b. The valves 129a and 129b are both operated by the record press in such a way that when the press closes, the conveyor piston 122a moves out, and when the press opens, the piston 122a moves in. It will be seen that the manual switch M2 provides a means for immobilising the valves. In order to prevent the operation of the shot conveyor drive when required and that two alternative manually operated pushbuttons P1 and P2 may be used as alternative means to the machine operated valves 129a and 129b respectively. The reference letter T applies to two tee valves each of which serve to provide a single outlet to the pressure operated valve 129 from either the press button operated valves or the machine controlled loader without the clearing of the record an inhibiting valve B is provided in the shot loader air circuit. Unless pressure is applied to this valve the air circuit to the shot loader is broken thereby preventing the traverse of the loader 9.

THE TIMER

The sequence and inter-relationship of operations in the present machine may conveniently be controlled by timers. These take the form of discs located on a common spindle which is driven through a train of gears by a motor. This motor must be capable of substantially constant speed operation and most particularly must have a very short stop time in order to prevent overrun of the spindle. On the discs are located levers in pairs which engage micro switches, the micro switches being of a latching variety so that the first lever causes the switch to make contact and the contact remains until the second lever strikes the knock-off arm of the switch thereby breaking the contact. For convenience these levers are capable of being located at any point around the periphery of each disc and a plurality of pairs of levers may be provided on each disc. The micro switches serve to operate solenoids controlling air and vacuum valves in the machine which are shown conventionally in FIGS. 7A and 7B. It is clear that a considerable flexibility in the operation of the machine may be achieved by the use of these timers as the timing of operations need not be dependent on the operation of another part of the machine itself.

Certain manual controls which override the operation of the timers are provided, in particular, the operation of the extruder and the cup may be so controlled. The timing sequence is illustrated graphically in FIG. 8 of the accompanying diagrams. The scale 0 to 100 indicates an arbitrary division of the periphery of the discs and represents one complete cycle of the spindle. The various blocks indicate the periods in which the solenoid operated valves are opened and the reference numbers R1 to R20 will be seen illustrated with reference to the circuits in FIGS. 7A and 7B. The reference letter M indicates switch contacts which hold the operating motor of the timer on after the operation of a press button switch has initiated movement of the spindle. It will be noted that R16 and R17 which control the vacuum to the label loaders are switched on almost at the end of a cycle and so remain until an appropriate moment within the next cycle when they are switched off. This means that at the end of a cycle unless the vacuum pump is switched off, suction will remain on the label loaders 70. As the operation of the relays is obvious from the foregoing description in conjunction with the circuit shown in FIGS. 7A and 7B no detailed consideration will be herein undertaken.

AIR AND VACUUM SERVICES

FIGS. 7A and 7B illustrate the general circuits of the air and vacuum services to the machine and refer to FIG. 8. It may be seen that all the solenoid operated valves whose numerals are prefixed by the letter R are primarily operated from timers in accordance with the timing arrangement shown in FIG. 8. This timing arrangement applies to the described embodiment only, and variations in absolute timing will occur due to the necessity for allowing for hysteresis in the system. As the layout of the circuit shown in 7A is conventional and moreover as a detailed description of many of the parts illustrated has already been given, FIG. 7A will not be exhaustively discussed. The air supply of the machine is delivered at 80 lbs. per square inch at the point marked A and is reduced where required by variable reducing valves marked V so that pressures at the magazines 5 and 6 are 30 lbs. per square inch, at the low pressure shot former 10 lbs. per square inch, at the heat exchanger 1b 20 lbs. per square inch, and at the diaphragm valves D1 to D9 60 lbs. per square inch. The heat exchanger 1b serves to heat air which is blown into the hopper 1. The functions of the diaphragm valves are referred to in the next paragraph. After passing through a shut off valve S1 and a filter F, the air supply is passed to air blasts on the mould through solenoid operated valve marked 20, to the blanking die blast 152 through machine operated valve 125A and also via a manually operated valve M1 to the heat exchanger 1b and so to the hopper 1. These supplies are drawn before lubrication of the air supply in lubricator L. Particular attention is drawn to this point as it is necessary to avoid contaminating the record material with grease at any stage in the manufacture.

The diaphragm valves D1 to D9 control hydraulic steam and water supplies to the extruder and press. D1 which is controlled alternatively by timer R6 or manual press button P3 controls the hydraulic supply causing the extruder piston to expel the shot. The raising of the extruder piston is accomplished normally by a machine operated valve E2 or alternatively by means of a manually operated press button P4. Diaphragm valve D3 controls the steam applied to the steam jacket on the extruder 2 and is controlled by manually operated valve M3. Diaphragm valves D4 and D5 control steam supply to the upper and lower parts of the hydraulic press and valves D6 and D7 similarly control the water supply to the press. The hydraulic supply to operate the record press is switched through diaphragm valve D8 while valve D9 controls the operation of the steam trap. Valves D4 to D9 are controlled by timers R1 to R4 as indicated in FIGS. 7A and 8.

The references S1 to S8 indicate shut off valves which may be used to immobilise any desired part of the machine and the devices indicated by reference letter C are flow regulators. The vacuum circuit shown in FIG. 7B is of known form and self explanatory and is therefore not described in further detail.

From the foregoing description it will be seen that the present embodiment is capable of many variations and means by which this invention is carried into effect may be considerably varied. The main aspect of the invention is, however, the provision of a system whereby preformed mouldable material together with both the upper and lower labels disposed in their correct relationship [is] *are* presented to the record mould simultaneously. It is in this arrangement that the major advantage of the machine resides. Also in the present embodiment a considerable flexibility of the operation of the machine is ensured by the use of timers, which substantially avoid the problems encountered when timing is derived from the machine itself.

The labels referred to in the description of the drawings are normal "pre-printed" gramophone record labels, but it is to be understood that unprinted labels or other pieces of paper, card or web material may alternatively be used for transferring the shot or preform of mouldable material into the record press. In some cases moreover it may be sufficient to apply only one "label" before transferring each shot to the press. Subsequently printed characters and/or designs may be applied to the labels or in some cases additional "pre-printed" labels may be applied. The term "label" used in the following claims is to be taken to have the general meaning indicated in this paragraph.

What we claim is:

1. A machine for the production of gramophone records, comprising a moulding press for pressing a record groove in mouldable material, means for delivering a quantity of said mouldable material to a label to cause the mouldable material to adhere to the label and transfer means operable to contact and convey the label and thereby the material to the moulding position in said moulding press.

2. A machine for the production of gramophone records comprising a moulding press for pressing a record groove in mouldable material means for causing a quantity of said mouldable material to adhere to a label, means for conveying said label and the adhering material to the moulding position in said moulding press, said conveying means including a suction device for holding said label during the conveying operation and for releasing said label when it is in the moulding position.

3. A machine according to claim 1 comprising gripping means for seizing excess material around the periphery of the record which has been extruded during the pressing process and displacing means for moving said gripping means and thereby conveying the record from the press.

4. A machine according to claim 1, said press having two moulds which can be opened and closed, means for applying a quantity of thermoplastic material in heated and therefore softened condition to said transfer means, means for causing a lable to adhere to the softened thermoplastic material, means for moving the transfer means to carry the label and the mouldable material into the press between said moulds while the moulds are opened, the label being interposed between the thermoplastic material and the transfer means to prevent adhesion of the thermoplastic material to the transfer means, means for heating the transfer means during the movement thereof to reduce cooling of the thermoplastic material, means for withdrawing the carrier from the press leaving the thermoplastic material in position for moulding, and means for closing the press to mould the thermoplastic material with a sound groove.

5. A machine for the production of gramophone records comprising:

(a) a storage vessel for storing thermoplastic material in a plastic condition,
(b) a magazine for storing labels for said gramophone records,
(c) means for picking up at least one label from said magazine,
(d) means for dispensing a quantity of said thermoplastic material so that it adheres to said one label,
(e) a moulding press,
(f) transfer means for delivering said label and the adherent thermoplastic material to the moulding position in said moulding press,
(g) heating means for heating said thermoplastic material whilst it is conveyed to said moulding position,
(h) means for causing said moulding press to press a record groove into said thermoplastic material,
(i) means for separating the leaves of said moulding press after said record groove has been pressed in such a way that said leaves remain substantially parallel to each other,
(j) means operable whilst said leaves are separated for moving said thermoplastic material after said record groove has been pressed and in a direction substantially parallel to the plane of said leaves.

*6. A machine for producing gramophone records comprising a moulding press including two mould supports and means for repetitively moving the mould supports together and then apart to press gramophone records, means for repetitively producing a shot of mouldable material sufficient to form a gramophone record and having two labels adhering respectively to the upper and lower surfaces of said shot, loading means for transferring each shot and the adhering labels to the press while said mould supports are apart, means for withdrawing said loading means and thereafter moving said mould supports together to press a record, and means for removing the pressed records from the press when said mould supports are again moved apart and before said loading means transfers a further shot to said press.*

*7. A machine for producing gramophone records comprising a moulding press including two mould supports and operating means for repetitively moving said mould supports together and then apart to press gramophone records, a shot loader, reciprocating means for reciprocating said shot loader from a first position at one side of said press to a second position between said mould*

*supports, preforming means for repetitively providing said shot loader at said first position with a shot of mouldable material sufficient to form a gramophone record and having two labels adhering respectively to the upper and lower surfaces of said shot, means for controlling said operating means, said reciprocating means and said preforming means to cause said shot loader to transfer a shot and the adhering labels to said press each time the mould supports are apart, to withdraw said shot loader and then move the mould supports together to press a record, a record processing tool at the other side of said press from said first position, and means operative repetitively to remove pressed records from said press to said*

*tool each time said mould supports are moved apart and before another shot is transferred to said press.*

References Cited

The following references, cited by the Examiner, are of record in the patented file of this patent or the original patent.

UNITED STATES PATENTS

| | | | |
|---|---|---|---|
| 2,743,478 | 5/1956 | Harlow et al. | 18—5.3 |
| 2,853,737 | 9/1958 | Harlow | 18—5.3 |
| 3,186,029 | 6/1965 | Joseph | 18—5.3 |

J. HOWARD FLINT, Jr., Primary Examiner